(12) United States Patent
Meisinger (10) Patent No.: US 7,896,151 B2
(45) Date of Patent: Mar. 1, 2011

(54) METHOD AND APPARATUS FOR COMBINING AND ALIGNING PACKING UNIT GROUPS

(75) Inventor: Alfred Meisinger, Kolbermoor (DE)

(73) Assignee: Krones AG, Neutraubling (DE)

( * ) Notice: Subject to any disclaimer, the term of this patent is extended or adjusted under 35 U.S.C. 154(b) by 4 days.

(21) Appl. No.: 12/384,431

(22) Filed: Apr. 3, 2009

(65) Prior Publication Data

US 2009/0250312 A1 Oct. 8, 2009

(30) Foreign Application Priority Data

Apr. 4, 2008 (DE) ............... 10 2008 002 818
Dec. 2, 2008 (DE) ............... 10 2008 055 471

(51) Int. Cl.
*B65G 47/26* (2006.01)
(52) U.S. Cl. ................... 198/419.2; 198/461.1
(58) Field of Classification Search .......... 198/419.2, 198/461.1, 461.2, 462.2
See application file for complete search history.

(56) References Cited

U.S. PATENT DOCUMENTS

| 5,097,939 | A * | 3/1992 | Shanklin et al. .......... 198/419.2 |
| 6,520,314 | B1 | 2/2003 | Seiling |
| 6,766,628 | B2 * | 7/2004 | Guidetti ................. 198/419.2 |
| 6,812,426 | B1 | 11/2004 | Kotowski et al. |
| 7,055,671 | B2 * | 6/2006 | De Guglielmo et al. .. 198/419.2 |
| 7,191,895 | B2 | 3/2007 | Zeitler et al. |
| 2002/0008002 | A1 * | 1/2002 | Guglielmo et al. ....... 198/419.2 |
| 2004/0112713 | A1 * | 6/2004 | Haan et al. ............. 198/419.2 |
| 2005/0246056 | A1 | 11/2005 | Marks et al. |

FOREIGN PATENT DOCUMENTS

| DE | 2346407 | 3/1974 |
| DE | 3339793 | 5/1984 |
| DE | 69004997 | 5/1994 |
| DE | 102005023859 | 12/2006 |
| EP | 1046598 | 10/2000 |
| EP | 1465101 | 10/2004 |
| EP | 1578680 | 9/2005 |
| GB | 2253826 | 9/1992 |

* cited by examiner

*Primary Examiner*—James R Bidwell
(74) *Attorney, Agent, or Firm*—Simpson & Simpson, PLLC

(57) ABSTRACT

A method for combining and aligning packing unit groups, having the steps of supplying, on an allocating conveyor, individual packing units and/or packing unit groups in an abutting relationship, operating a transportation conveyor downstream of the allocating conveyor with a first transportation speed, forming batches of packing units and/or packing unit groups, wherein predefined gaps are created between the batches by controlling the speed of the allocating conveyor in a corresponding manner, and transferring the batches with the gap predefined between them onto a row or layer forming conveyor, wherein the row or layer forming conveyor is operated at a second speed.

15 Claims, 6 Drawing Sheets

Fig. 10

METHOD AND APPARATUS FOR COMBINING AND ALIGNING PACKING UNIT GROUPS

CROSS REFERENCE TO RELATED APPLICATIONS

This patent application claims priority of German Patent Application No. DE 10 2008 002 818.5, filed on Apr. 4, 2008, and German Patent Application No. DE 10 2008 055 471.5, filed on Dec. 2, 2008, which applications are incorporated herein by reference in their entireties.

FIELD OF THE INVENTION

This invention relates to a method for combining and aligning package unit groups. The invention also relates to an apparatus for combining and aligning packing unit groups.

BACKGROUND OF THE INVENTION

Grouping tables for bringing together packing units, such as cartons, shrink packs, trays and plastic boxes, constructed as roller conveyors, are well known. The packing units can be brought together in a two-dimensional formation (block formation, e.g., pallet layer). This is done by supplying the roller conveyor from one or a plurality of branch conveyors. The packing units are then turned as needed prior to or on the roller conveyor and mechanically arranged in the required position by means of stopping points. The arranged packing units are then pushed off the roller conveyor at a right angle to the transporting direction. The supply, arrangement and pushing-off of the packing units is treated as one cycle. For combining a layer, one or more cycles are necessary. A drawback in this known configuration is that gentle handling of the packing units is not ensured because the packing units roughly impact on the stopping points.

European Patent EP 1 465 101 B1 discloses an apparatus for row formation of packing goods for packing unit palleters. The packing unit palleter has at least one layering station and at least one palleting station. The row formation apparatus has at least one positioning station on which the packing goods are arranged in at least one row with desired gaps during transportation. The positioning station is coupled to a supply conveyor associated with the layering station. Upstream of the positioning station, at least one accumulating conveyor is arranged, wherein the positioning station comprises a plurality of conveying sections having controllable and feedback controllable drives, arranged one after the other in the transportation direction. The controllable and feed-back controllable drives enable the desired gaps to be formed in the packing goods. The row formation apparatus has at least one monitoring means for determining and monitoring the gap formation in the packing goods. The structure of the apparatus for forming a row for the layer in a pallet is complicated. A plurality of conveyors is necessary for achieving gap formation and/or for turning the packing goods.

U.S. Pat. No. 7,191,895 B2 discloses a system of conveyor belts for supplying articles to a sorting unit. Sensors are also provided for determining the position and/or alignment of the articles transported on the surface of the conveyor belt. The sensors are connected to a control unit which checks the entry of the articles into the sorting unit or controls the gap between the articles. The articles are not combined, however, for the layer of a pallet.

U.S. Pat. No. 6,812,426 discloses an apparatus enabling goods to be fed onto a further conveyor belt at a given interval, however, the act of palleting is not disclosed.

British Patent Application GB 2 253 826 A discloses an apparatus for combining articles to groups and then for packaging the articles of the groups. On a supply belt, the articles are supplied, each at a predefined interval, to a collecting conveyor, on which the groups are combined always of the same number of articles. The groups are then fed to a packaging apparatus with a subsequent belt.

European Patent Application No. 90103315.9 discloses a device for group formation and synchronizing of objects fed to a packaging machine. A flow compensation conveyor is provided for transporting the incoming objects and supplying them to a supply conveyor provided with bars arranged at equidistant intervals for separating groups of objects. Further, a first speedometer is provided, which can produce a signal proportional to the speed of the supply conveyor. A predetermined gap is adjusted with at least one correction conveyor driven by a speed-variable motor between the flow compensation conveyor and the supplying conveyor. The correction conveyor has an object position detector associated with it, which can emit a signal at the moment at which each article is placed on the correction conveyor, and has circuit means driven by the first speedometer and the object position detector to control the speed-variable motor. The device also comprises a bar detector, which outputs a signal whenever a bar passes the latter. The circuit means also comprises a connected microprocessor for each correction conveyor to obtain the signals from the bar detector, from the speedometer and from the object position detector for the associated correction conveyor and to supply a speed control signal to the speed-variable motor. The microprocessor is programmed to control the speed of the associated correction conveyor with respect to a basic value proportional to the speed of the supplying conveyor. In response thereto, this basic value is immediately changed by an additive correction constant proportional to the product of this basic value and the time difference of the signals output by the bar detector and the object position detector.

German Patent Application DE 10 2005 023 859 A1 discloses a grouping table for combining packing units, in particular shrink packs, for layer formation, comprising a continuously drivable conveyor, a step conveyor intermittently drivable and downstream of the conveyor, a layer formation station arranged adjacent to the step conveyor and a push-off means associated with the step conveyor and effective at right angles to the conveying direction, for group-wise transferal of the packing units to the layer formation station.

U.S. patent application Ser. No. 10/892,786 discloses a system for arranging packing units in a layer, which is ultimately placed or stacked on a pallet. Herein, three conveyor belts are linearly arranged. The packing units are provided to the apparatus via a first conveyor belt. The packing units are linearly arranged on the first conveyor belt. A second conveyor belt is used to separate the packing units. Subsequently, the packing units pass to a third conveyor belt, in which the arrangement of the packing units is carried out. All three conveyor belts run at different, but constant, speeds. After a layer is completely combined, the layer is transferred to the pallet.

Patent Specification EP 1 046 598 describes an apparatus for handling container packets, typically bottles or cans, for arranging them according to a predetermined configuration to enable transporting them to a pallet.

European Patent EP 1 578 680 B1 discloses an apparatus for arranging and orienting packets. First, a packet that is too fast is detected. Then the speed of a drive motor of a first conveyor is measured, on which the packet that is too fast is present. Then a counter is incremented as a function of the speed of the motor of the first conveyor. Reduction of the feeding speed is carried out with the help of the value assumed by the counter. Then the feeding speed of the second conveyor is increased as a function of the value assumed by the counter.

In packaging and palleting plants, as is well known, packets containing processed goods must be handled or aligned in lines, which serve the process or processing and are usually arranged upstream of the above mentioned handling station. This is necessary, in particular, in plants for handling containers for drinks, in particular cans and bottles of glass or plastic material, containing water, beer or wine. The packages in question can be, in particular, crates, cartons, packing units or clusters.

According to the state of the art, packing units are individually transferred from an allocating conveyor to a transportation conveyor. This means that, on the allocating conveyor, only one packing unit is transferred to the transportation conveyor at a time. This is done by handing over each individual packing unit individually to the transportation conveyor by means of a speed difference between the allocating conveyor and the transportation conveyor. Control is carried out by means of an arrangement of a plurality of light barriers.

To build up a transportation-safe pallet it is necessary to combine a plurality of packing units and/or packing unit groups to a batch. To be able to hand over a plurality of packing units at the same time as one batch from the transportation conveyor to the layer forming conveyor, they are first handed over from the allocating conveyor to the transportation conveyor in a stepwise manner, collected there and then handed over to the layer forming conveyor.

It has also been observed that the packing units are handed over from the transportation conveyor by intermittently traversing the layer forming conveyor in an individual manner. This means that for handing over a packing unit from the transportation conveyor to the layer forming conveyor, the layer forming conveyor is traversed in synchronism with the transportation conveyor by precisely one packing unit length in the conveying direction.

These batches can also be turned on the transportation conveyor depending on the layer formation and then handed over to the layer forming conveyor.

The state of the art has several drawbacks. When gaps are formed or the packing units are handed over between the allocating conveyor, the transportation conveyor and even the layer forming conveyor, the packing units are not handed over in an exact manner due to speed differentials and high accelerating and delaying ramps. The packing units are therefore often turned out of their predetermined positions. An important factor herein is also frictional resistance between the conveyor and the packing unit bottom surface. It is not possible to form an exact gap between the batches. In addition, there is also an energy loss arising from the distance to be traversed for the individual gaps in the batching process from the allocating conveyor to the transportation conveyor. This is how ultimately the time required for building up a pallet is increased.

BRIEF SUMMARY OF THE INVENTION

It is an object of the present invention to create a method allowing batches of packing units and/or packing unit groups to be provided in a safe, quick and high-quality manner, so that the rows for the layers of a pallet can be established in an efficient manner.

The above object is solved by a method comprising the steps; supplying, on an allocating conveyor, individual packing units and/or packing unit groups in an abutting relationship; operating a transportation conveyor downstream of the allocating conveyor with a first transportation speed; forming batches of packing units and/or packing unit groups, wherein predefined gaps are created between the batches by controlling the speed of the allocating conveyor in a corresponding manner; and transferring the batches with the gap predefined between them onto a row or layer forming conveyor, wherein the row or layer forming conveyor is operated at a second speed.

It is a further object of the present invention to create an apparatus allowing batches of packing units and/or packing unit groups to be provided in a safe, quick and high-quality manner, so that the rows for the layers of a pallet can be established in an efficient manner.

The above object is solved by an apparatus comprising: an allocating conveyor configured as an accumulating conveyor, a transportation conveyor and a row or layer forming conveyor; wherein each of the allocating conveyor, the transportation conveyor and the row or layer forming conveyor has its own motor associated with it; and a control for controlling at least a speed of the allocating conveyor to form from the packing units and/or packing unit groups, transported on the allocating conveyor in an abutting relationship, a plurality of batches of packing units and/or packing unit groups on the transportation conveyor, spaced from each other by a predefined gap.

It has been shown that in a method for combining, first of all, individual packing units and/or packing unit groups are supplied on an allocating conveyor in an abutting relationship.

Downstream of the allocating conveyor is a transportation conveyor operated at a first transportation speed. Batches are formed of the packing units and/or packing unit groups, wherein predefined gaps are created between the batches by controlling the speed of the allocating conveyor in a corresponding manner. The batches are transferred onto a row or layer forming conveyor while observing the predefined gap between them, wherein the row or layer forming conveyor is driven at a second speed.

According to a first embodiment, a robot is associated with the row or layer forming conveyor for displacing and/or turning in the transportation and/or transverse to the transportation direction the batches coming in from the transportation conveyor for the layer formation required for palleting. On the row or layer forming conveyor, a layer consisting of a plurality of rows is formed.

According to a further embodiment, the transportation conveyor has an orienting means associated with it for bringing the batches arriving with the gaps between them into a predetermined orientation. The batches are then transferred onto the layer forming conveyor with this adjusted orientation.

According to a further embodiment of the invention it is also possible to supply the packing units and/or packing unit groups on the allocating conveyor in the orientation required for the transportation conveyor and the row or layer forming conveyor.

For carrying out the various embodiments of the method, a programmable control is provided for controlling a first motor associated with the allocating conveyor, a second motor associated with the transportation conveyor and/or a third motor associated with the row or layer forming conveyor in such a way that the predefined batches and their gaps are maintained on the transportation conveyor. At least the transportation conveyor and the layer forming conveyor are driven as far as possible at a constant speed.

A light barrier arrangement arranged above the allocating conveyor is used for checking whether the packing units and/or packing unit groups are transported on the allocating conveyor in an abutting relationship. If a gap is detected between the packing units and/or packing unit groups on the allocating conveyor, the allocating conveyor is controlled by means of the light barrier arrangement in such a way that the gap is closed.

At least one light barrier arrangement is arranged in the area of the transition from the allocating conveyor to the transportation conveyor, used for determining the predefined gaps between the batches. Any deviation from the predefined gap causes the allocating conveyor and/or the transportation conveyor to be controlled in a corresponding manner.

The apparatus according to the present invention for combining and orienting packing units and/or packing unit groups comprises an allocating conveyor, a transportation conveyor and a row or layer forming conveyor. The allocating conveyor, the transportation conveyor and the row or layer forming conveyor are each provided with their own motors. A control is provided for controlling at least the speed of the allocating conveyor to form a plurality of batches of packing units and/or packing unit groups on the transportation conveyor from the packing units and/or packing unit groups transported on the allocating conveyor in an abutting relationship, so that they are spaced from each other by a predefined gap (D).

According to a first embodiment for forming the layers for a pallet, a robot is associated with the row or layer forming conveyor. The batches coming in from the transportation conveyor are displaced and/or turned by the robot in the transportation direction and/or transverse to the transportation direction for layer formation. The row or layer forming conveyor has at least a width sufficient to receive the complete layer before it is transferred onto a pallet. In another embodiment of the apparatus, an orienting means is associated with the transportation conveyor. The correspondingly oriented row of batches is then transferred from the transportation conveyor onto the row or layer forming conveyor.

Further it is possible that the allocating conveyor is configured as an accumulating conveyor. On the allocating conveyor, the packing units and/or packing unit groups are present in the orientation required for the transportation conveyor and the row or layer forming conveyor.

The invention is based on a programmed control enabling at least one batch to be handed over in one go to the transportation conveyor and a row or layer forming conveyor, wherein the next batch in the process is handed over to the layer forming conveyor after a predefined gap. As explained above, a batch can consist of a plurality of packing units arranged in a row. Usually, a batch consists of more than one packing unit. A batch can also consist of one packing unit, however. The batches are always formed as they are handed over from the allocating conveyor to the transportation conveyor. The control knows how the individual batches must be combined. The allocating conveyor is then controlled in a corresponding manner so that the packing units and/or packing unit groups are handed over from the allocating conveyor to the transportation conveyor in such a way that the packing units and/or packing unit groups of a batch are placed on the transportation conveyor without gaps and so that the predefined gap is adjusted between the individual batches.

The gap between the individual batches needed for layer formation is determined by means of light barrier sensor technology by precisely determining the position of the packing units on the allocating conveyor. On the basis of this precise position determination it is possible subsequently to precisely create the gap needed between two batches with the aid of disc cam control (electronic disc cam control). The gaps can be established between the individual batches in a completely variable manner with the aid of this control technology. This means that the gap between the first batch and the second batch could be 200 mm, for example, and between the second batch and the third batch 100 mm. This has not been possible in such a precise manner prior to the present invention.

In the description to the present invention, the term batch is to be used for one or more packing units or packing unit groups. If a plurality of packing units or packing unit groups forms a batch, the packing units or packing unit groups are contiguous to each other without gaps and are in contact with each other.

The advantages of the present invention are considerable. There is no turning of the packing units or packing unit groups due to them being handed over from the allocating conveyor to the transportation conveyor and further to the layer forming conveyor on a batch by batch basis. By means of the electronic disc cam control of the allocating conveyor, which is an accumulating conveyor, the batches are transferred to the transportation conveyor essentially operated at constant speed. Precise gap formation between the individual batches is therefore possible. There is an economy of time since there are no gaps between individual packing units in this transfer on a batch by batch basis, and there is no undesirable turning of the batches. Preceding gaps from packing unit transport are compensated. Moreover, the individual packing units or packing unit groups support each other within one batch when they are transferred on a batch by batch basis.

These and other objects and advantages of the present invention will be readily appreciable from the following description of preferred embodiments of the invention and from the accompanying drawings and claims.

BRIEF DESCRIPTION OF THE DRAWINGS

Exemplary embodiments of the method according to the present invention and the apparatus according to the present invention and their advantages will be explained in more detail with reference to the accompanying drawings, wherein.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it should be understood that this invention is not limited to the particular methodology, materials and modifications described and as such may, of course, vary. It should also be understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
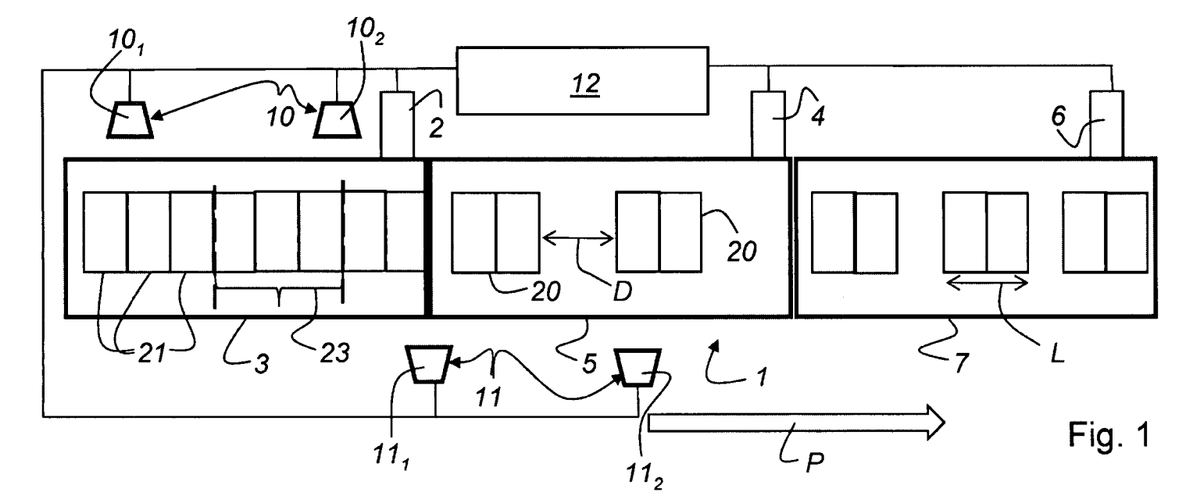
FIG. 1 is a schematic plan view of the apparatus for arranging and combining batches from packing units or packing unit groups.

FIG. 1 is a schematic plan view of an apparatus 1 for arranging and combining batches 20 of packing units 21 or packing unit groups 23. The difference between packing units 21 and packing unit groups 23 is that packing unit groups 23 already consist of more than one packing unit 21. This is indicated in FIG. 1 in a corresponding fashion. Apparatus 1 comprises an allocating conveyor 3 driven by a motor 2. Downstream of allocating conveyor 3 is a transportation conveyor 5. Downstream of transportation conveyor 5 is a row or layer forming conveyor 7. Allocating conveyor 3 is drivable by means of a first motor 2. Transportation conveyor 5 is drivable by means of a second motor 4. Row or layer forming conveyor 7 is drivable by means of a third motor 6. Allocating conveyor 3, transportation conveyor 5 and row or layer forming conveyor 7 are driven in the direction of an arrow P. Individual packing units 21 or packing unit groups 23 are supplied by allocating conveyor 3 in an abutting relationship. Allocating conveyor 3 is intermittently driven by a control 12 in such a way that batches 20 are spaced on transportation conveyor 5 by a predefined gap D. Batches 20 are transferred from transportation conveyor 5 to row or layer forming conveyor 7. The transportation conveyor moves at essentially constant speed to transfer batches 20 onto row or layer forming conveyor 7. To achieve this, a programmable control 12 is provided for controlling first, second and/or third motor 2, 4 and/or 6 in such a way that a batch 20 is transferred from transportation conveyor 5 onto row or layer forming conveyor 7 in one go. By means of programmable control 12 it is possible to transfer packing units 21 or packing unit groups 23 supplied by allocating conveyor 3 in an abutting relationship onto transportation conveyor 5 according to the required batch 20 for row formation.

Allocating conveyor 3 has a first light barrier arrangement 10 associated with it. Light barrier arrangement 10 can comprise, for example, a first light barrier $10_1$ and a second light barrier $10_2$ for checking whether packing units 21 and/or packing unit groups 23 are really transported on the allocating conveyor in an abutting relationship for high-quality paletting. The information from light barrier arrangement 10 is transferred to control 12 so that the transportation of packing units 21 and/or packing unit groups 23 is always ensured in an abutting relationship. In the area of the transition from allocating conveyor 3 to transportation conveyor 5, a further light barrier arrangement 11 is provided. This further light barrier arrangement 11 can comprise, for example, a first light barrier $11_1$ and a second light barrier $11_2$. From the further light barrier arrangement 11, information on length L of batches 20 and gap D between batches 20 is passed to control 12. Control 12 is used to control the speed of allocating conveyor 3 in such a way that the batches 20 required by the program are transferred from allocating conveyor 3 to transportation conveyor 5 with the predefined gap. Further light barrier arrangement 11 is also used for quality control to verify gap D between batches 20. Transportation conveyor 5 and layer forming conveyor 7 run at constant speed.

Figure 2:
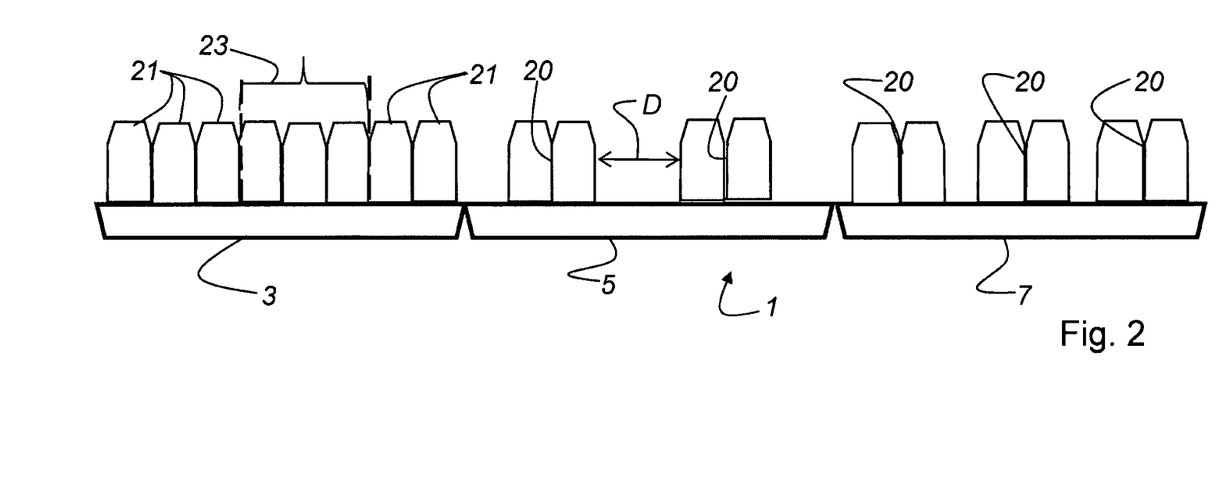
FIG. 2 is a schematic side view of the apparatus, wherein the packing units or packing unit groups are combined to batches.

FIG. 2 is a schematic side view of apparatus 1, wherein packing units 21 and/or packing unit groups 23 (consisting here of three packing units 21, for example) are combined to batches 20. Batches 20 combined in the present example consist of two packing units 21. Depending on the programming of control 12, basically any desired type of batches 20 can be combined. Individual batches 20 are ultimately determined by the pattern of the layers required for paletting.

Figure 3:
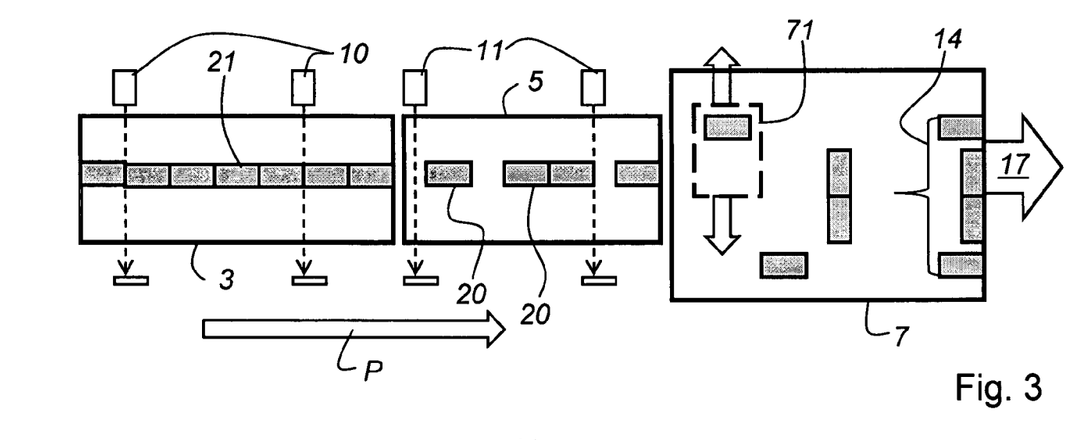
FIG. 3 shows a first embodiment of the apparatus for creating batches for the formation of rows to form layers for a pallet therefrom.

FIG. 3 shows a first embodiment of apparatus 1 for creating batches 20 for the formation of rows to create layers for a pallet therefrom. Apparatus 1 consists of allocating conveyor 3, transportation conveyor 5 and row or layer forming conveyor 7. Allocating conveyor 3 supplies the packing units in an abutting relationship. Transportation conveyor 5 runs essentially continuously and transports batches 20 with predefined gap D. Row or layer forming conveyor 7 forms a row from the incoming batches for a layer, which are then transferred to a paletting machine (not shown) in the direction of arrow 17. In the embodiment shown here, row or layer forming conveyor 7 has a robot 71 associated with it, which displaces and/or turns batches 20 coming in from transportation conveyor 5 for layer formation in the transporting direction and/or transverse to the transporting direction P. Row or layer forming conveyor 7 is broader than allocating conveyor 3 and transportation conveyor 5. Row or layer forming conveyor 7 is integrated into a so-called ROBOBOX, which positions and/or orients the batches according to a control and layer formation software. As already mentioned in the description with respect to FIG. 1, light barrier arrangements 10, 11 check whether or not packing units 21 or packing unit groups 23 are really transported in an abutting relationship on allocating conveyor 3. It is further checked whether or not the required batch lengths are formed at the transfer from allocating conveyor 3 onto transportation layer 5. Control 12 feedback controls the speed for allocating conveyor 3 so that batches 20 are formed as required according to the layer formation software.

Figure 4:
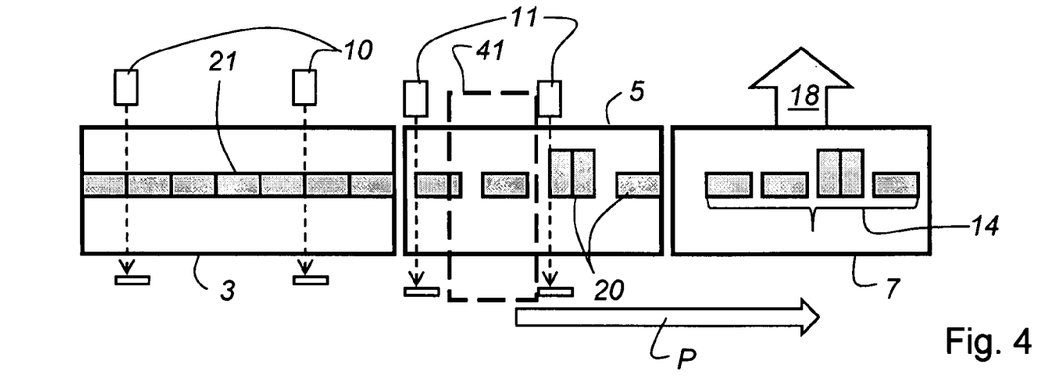
FIG. 4 shows a second embodiment of the apparatus for creating batches for the formation of rows to create layers for a pallet therefrom.

FIG. 4 shows a second embodiment of the apparatus for creating batches 20 for the formation of rows 14 to ultimately combine layers for a pallet. Herein, transportation conveyor 5 has an orienting means 41 associated with it, which brings incoming batches 20 into the orientation predetermined by control 12. The thus oriented batches 20 are transferred to layer forming conveyor 7. Allocating conveyor 3 is used to supply packing units 21 or packing unit groups 23 in an abutting relationship. On transportation conveyor 5, which runs essentially continuously, batches 20 are transported with a certain gap D between them. An orientation means 41 is associated with transportation conveyor 5 for turning (orienting differently) the batches selected by control 12 (layer formation software). A row 14 for a layer intended for paletting is formed of incoming batches 20 on row or layer forming conveyor 7. As already mentioned above, a first light barrier arrangement 10 is provided for checking whether or not there are gaps between packing units 21 or packing unit groups 23 on allocating conveyor 23, since it is required that packing units 21 or packing unit groups 23 are in an abutting relationship on the allocating conveyor. A second light barrier arrangement 11 is also associated with transportation conveyor 5 for checking whether or not gap D required by the system is formed between batches 20 on transportation conveyor 5. Control 12 feedback controls the speed for allocating conveyor 3 so that batches 20 required according to the layer formation software are formed for the downstream transportation conveyor. As already mentioned in the description with respect to FIG. 1, an individually controllable motor 2, 4 and 6 is associated with allocating conveyor 3, transportation conveyor 5 and row or layer forming conveyor 7, respectively. Completed row 14 is transferred in the direction of arrow 18 from row or layer forming conveyor 7 onto a layer forming unit (not shown). This is repeated until a layer is completed on the layer forming unit and can be transferred onto a pallet.

Figure 5:
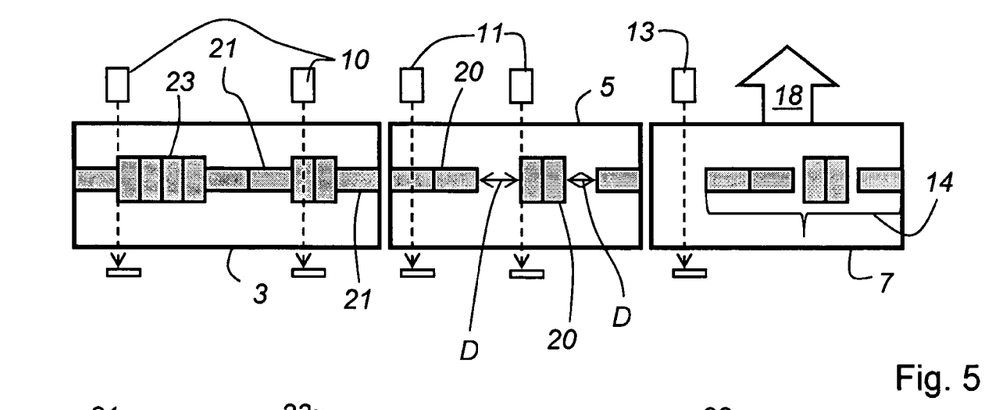
FIG. 5 shows a third embodiment of the apparatus for creating batches for the formation of rows to create layers for a pallet therefrom.

FIG. 5 shows a third embodiment on apparatus 1 for creating batches 20 for the formation of rows 14 to ultimately form layers for a pallet. In the present case, packing units 21 and/or packing unit groups 23 are supplied on allocating conveyor 3 already in the orientation required for transportation conveyor 5 and row or layer forming conveyor 7. Allocating conveyor 3 is an accumulating conveyor so that packing units 21 and/or packing unit groups 23 are supplied in an abutting relationship. A first light barrier arrangement 10 is associated with allocating conveyor 3 for checking whether or not there are gaps between packing units 21 and/or packing unit groups 23 on allocating conveyor 3, since packing units 21 and/or packing unit groups 23 are conveyed in an abutting relationship on the allocating conveyor. A second light barrier arrangement 11 is further associated with transportation conveyor 5 for checking whether or not gap D required by the system is formed between batches 20 on transportation conveyor 5. Transportation conveyor 5 runs essentially continuously, while batches 20 are formed by the speed control of allocating conveyor 3. The batch formation and gap D are checked by means of a further light barrier arrangement 11. The turned batches and/or unturned batches are combined to a row by means of a row or layer forming conveyor 7 downstream of transportation conveyor 5. This can be done by a stop associated with row or layer forming conveyor 7. Row or layer forming conveyor 7 can also have a light barrier arrangement 13 associated with it for checking batches 20 coming in on row or layer forming conveyor 7 with respect to their length L. From row or layer forming conveyor 7, completed row 14 is transferred in the direction of arrow 18 onto a layer formation unit (not shown). This is repeated until a layer is completed on the layer formation unit and can be transferred onto a pallet.

Figure 6:
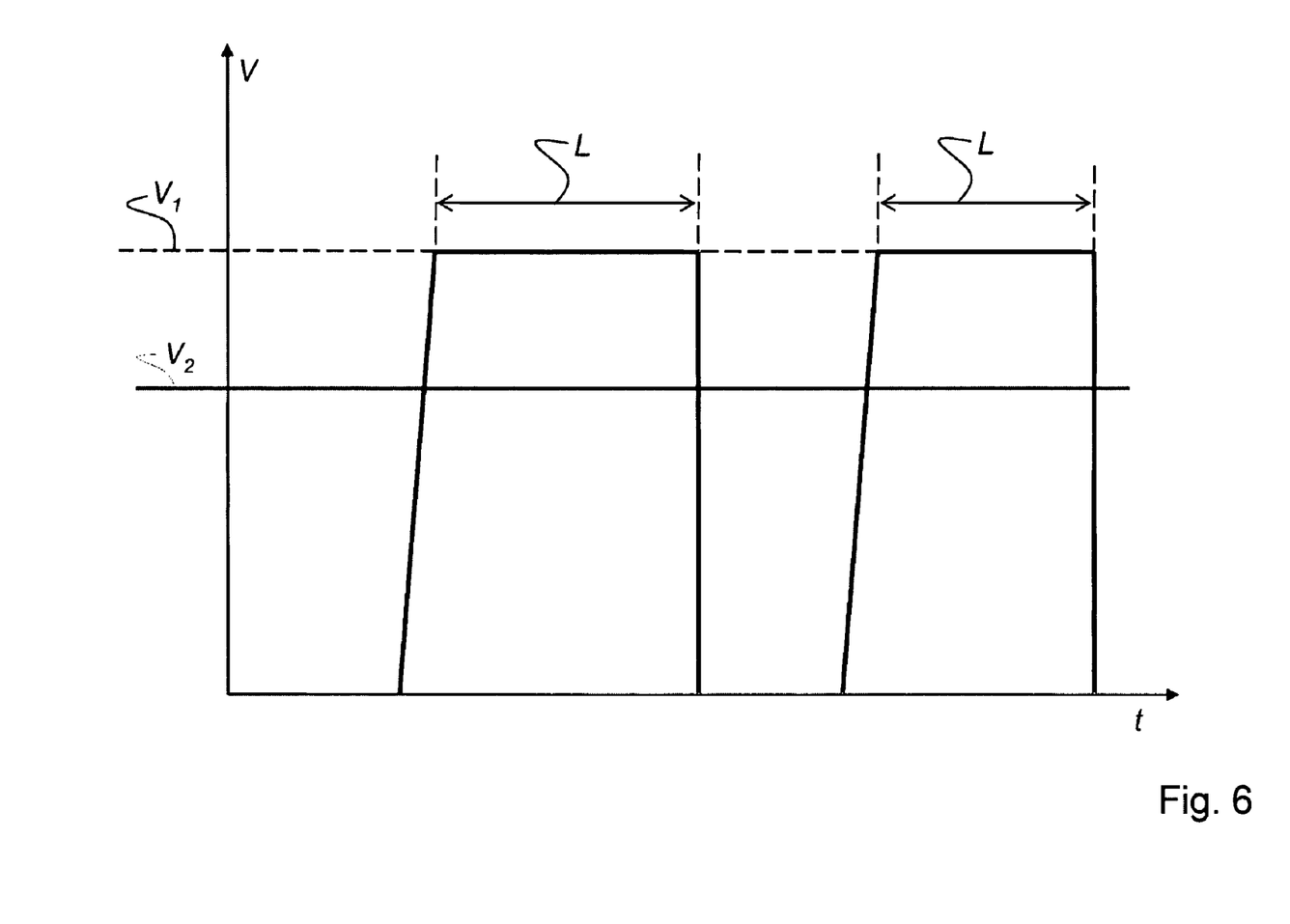
FIG. 6 shows a disc cam control diagram for speed control of the supplying conveyor to achieve gap formation between two subsequent batches on the transportation conveyor.

FIG. 6 shows a disc cam control diagram 25 for gap formation between two subsequent batches 20 on transportation conveyor 5, which is downstream of allocating conveyor 3. In this diagram, $V_1$ is the speed of allocating conveyor 3. $V_2$, in this diagram, is the essentially constant speed of transportation conveyor 5. Allocating conveyor 3 is operated in batch intervals in order to form required batches 20 of desired lengths L from packing units 21 or packing unit groups 23 supplied in an abutting relationship. The speed of allocating conveyor 3 is increased to speed $V_1$ for forming batches 20, which is greater than the speed $V_2$ of transportation conveyor 5. By suitably controlling allocating conveyor 3, the desired gap D can be adjusted between batches 20.

Figure 7:
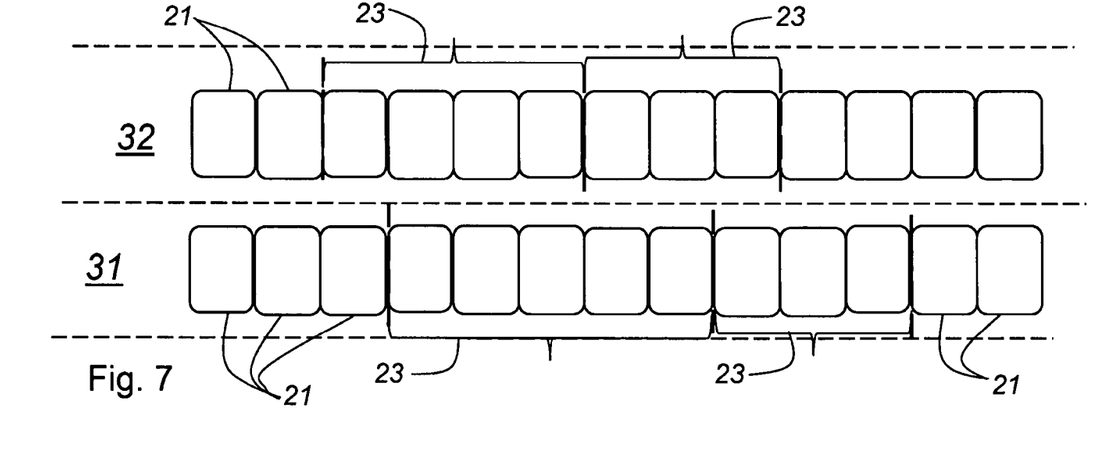
FIG. 7 shows a possible embodiment in which the packing units or packing unit groups on the supply conveyor are supplied in two lanes.

FIG. 7 shows a possible embodiment, in which packing units 21 or packing unit groups 23 are supplied on supplying conveyor 3 in two lanes 31 and 32. Packing units 21 or packing unit groups 23 can be subdivided differently in the two lanes 31 and 32. Packing units 21 or packing unit groups 23 are also supplied in an abutting relationship.

Figure 8:
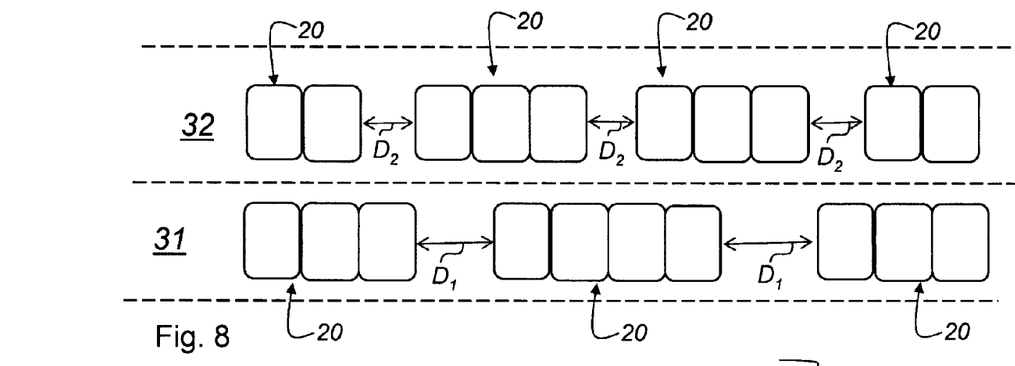
FIG. 8 shows a possible embodiment in which two lanes of batches are present on the transportation conveyor.

FIG. 8 shows a possible embodiment, in which there are two lanes of batches 20 on transportation conveyor 5. Batches 20 in first lane 51 are always spaced by gap $D_1$. Batches 20 on second lane 52 are spaced from each other by gap $D_2$. If more than two lanes of batches are processed, this increases the efficiency of the apparatus. It is also conceivable to have two or more allocating conveyors 3, two or more transportation conveyors 5 and two or more row or layer forming conveyors 7 arranged parallel to each other.

Figure 9:
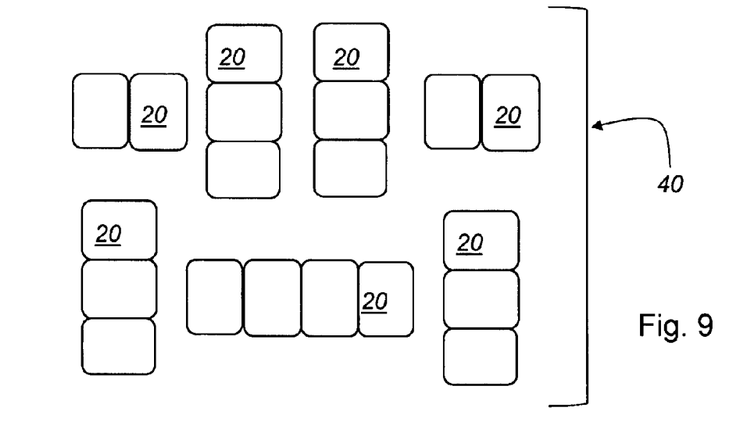
FIG. 9 shows a possibility of turning the batches present on the transportation conveyor shown in FIG. 8 to be able to form a layer for a pallet on the row or layer forming conveyor of an embodiment of the invention; and, FIG. 10 is a plan view of a layer combined of different batches.

FIG. 9 shows a possibility of how batches 20 present on transportation conveyor 5 shown in FIG. 8 can be turned to form a layer 40 (see FIG. 10) for a pallet.

Figure 10:
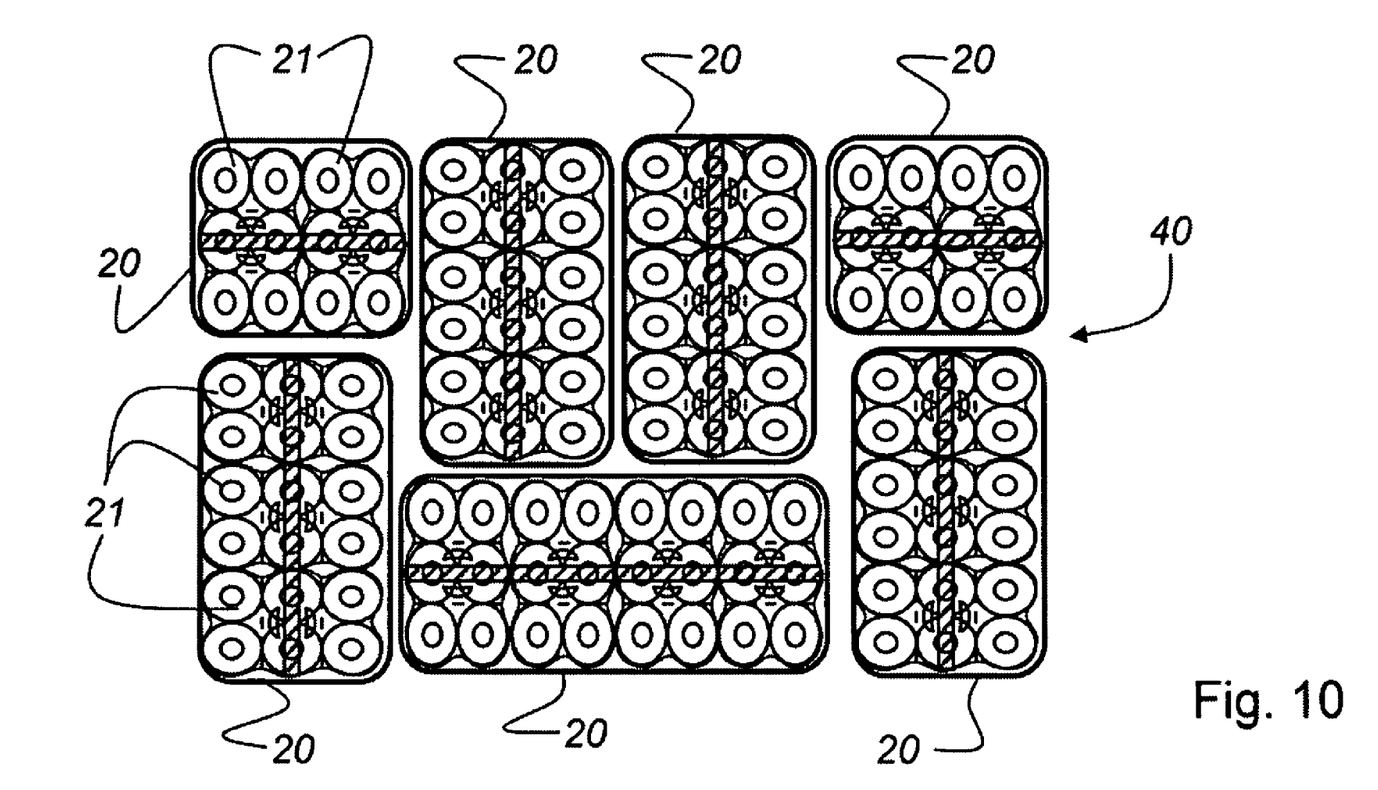

FIG. 10 is a plan view of a layer 40 combined from different batches 20. Batches 20 are of different lengths to form a compound in one layer 40. Individual batches 20 are indicated by a line at the periphery of individual packing units 21 of a batch 20. The line is only for illustrating individual batches 20. In the embodiment shown here, each batch 20 has been combined from a plurality of packing units 21 of liquid containers. Individual packing units 21 are shrink packs, which can and must not be construed as a limitation of the invention. Complete layer 40 can then be placed on a pallet (not shown) by an automatic gripper (not shown). The individual layers 40 which are placed on the pallet one after the other are combined in a compound structure so that additional stability results from the plurality of layers 40 on the pallet from the compound structure.

The invention has been described with reference to a preferred embodiment. It is conceivable to a person skilled in the art, however, that changes or modifications of the invention can be made without leaving the scope of protection of the appended claims. It goes without saying that the present invention is executable with all manner of different types of packing units.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A method for combining and aligning packing units and/or packing unit groups to form rows for a layer of a pallet, comprising the following steps:

supplying, on an allocating conveyor, individual packing units and/or packing unit groups in an abutting relationship, wherein the allocating conveyor is drivable by a first motor;

operating a transportation conveyor downstream of the allocating conveyor with a second motor driven at a constant transportation speed;

forming batches of a desired length of packing units and/or packing unit groups having a desired gap between the batches, wherein a speed of the allocating conveyor is controlled according to the batches to be formed and the speed of the allocating conveyor is essentially equal to the speed of the transportation conveyor so that the batches of the desired length are transferred to the transportation conveyor;

reducing the speed of the allocating conveyor, if the last unit of the respective batch with the desired length is transferred from the allocating conveyor to the transportation conveyor, so that the desired gap is between a current batch on the transportation conveyor and a next batch to be transferred from the allocating conveyor to the transportation conveyor; and, transferring the batches with the gap predefined between them onto a row or layer forming conveyor, which is driven by a third motor.

2. The method recited in claim 1, wherein the row or layer forming conveyor has a robot associated with it for displacing and/or turning the batches coming in from the transportation conveyor for layer formation in the transporting direction and/or transverse to the transporting direction.

3. The method recited in claim 2, wherein a layer of a plurality of rows is formed on the row or layer forming conveyor.

4. The method recited in claim 1, wherein the transportation conveyor has an orienting means associated with it, which brings the incoming batches in a predetermined orientation, and wherein the batches are transferred onto the row or layer forming conveyor with this adjusted orientation.

5. The method recited in claim 1, wherein the packing units and/or packing unit groups are supplied on the allocating conveyor in the orientation required for the transportation conveyor and the row or layer forming conveyor.

6. The method recited in claim 1, wherein a programmable control is provided for controlling the first motor associated with the allocating conveyor, the second motor associated with the transportation conveyor and/or the third motor associated with the row or layer forming conveyor in such a way that the predefined lengths of the batches and their gaps are maintained on the transportation conveyor, where the transportation conveyor and the layer forming conveyor are driven at a constant speed as far as possible.

7. The method recited in claim 6, wherein a light barrier arrangement is associated with the allocating conveyor for checking whether or not the packing units and/or packing unit groups are transported on the allocating conveyor in an abutting relationship, and wherein, on detection of a gap between the packing units and/or packing unit groups on the allocating conveyor by the light barrier arrangement in combination with the programmable control, control the transportation conveyor and the allocating conveyor in such a way that the batches with a predefined length of packing units and/or packing unit groups are transferred to the transportation conveyor with a gap within a respective batch.

8. The method recited in claim 6, wherein at least one light barrier arrangement is arranged in the area of the transition between the allocating conveyor and the transportation conveyor, with which the predefined gaps between the batches and the desired length of the batches are determined and in that, if there is a deviation from the predefined gap, the speed of the allocating conveyor is controlled in a corresponding manner.

9. An apparatus for combining and aligning packing units and/or packing unit groups, comprising:

an allocating conveyor with a first motor configured as an accumulating conveyor, a transportation conveyor with a second motor and a row or layer forming conveyor with a third motor; and, a control for controlling at least a speed of the allocating conveyor to form from the packing units and/or packing unit groups, transported on the allocating conveyor in an abutting relationship, a plurality of batches of packing units and/or packing unit groups on the transportation conveyor, spaced from each other by a predefined gap and having a predefined length, wherein the transportation conveyor is driven with a constant speed.

10. The apparatus recited in claim 9, wherein the row or layer forming conveyor has a robot associated with it for displacing and/or turning the batches coming in from the transportation conveyor in a transporting direction and/or transverse to the transporting direction for layer formation, and wherein the row or layer forming conveyor is configured in such a way that a layer consisting of a plurality of rows is creatable.

11. The apparatus recited in claim 9, wherein an orienting means is associated with the transportation conveyor for bringing the incoming batches into a predetermined orientation, and wherein the oriented batches are transferable as a row onto the layer forming conveyor.

12. The apparatus recited in claim 9, wherein the packing units and/or packing unit groups are provided on the allocating conveyor in the orientation required for the transportation conveyor and the row or layer forming conveyor.

13. The apparatus recited in claim 9, wherein the control is a programmable control for controlling the first motor associated with the allocating conveyor, the second motor is associated with the transportation conveyor, and/or the third motor is associated with the row or layer forming conveyor in such a way that the plurality of batches are provided on the transportation conveyor with a predefined length and a predefined gap.

14. The apparatus recited in claim 13, wherein a light barrier arrangement associated with the allocating conveyor checks the abutting relationship of the packing units and/or the packing unit groups.

15. The apparatus recited in claim 13, wherein at least one light barrier arrangement is arranged in the area of the transition between the allocating conveyor and the transportation conveyor for determining the predefined gaps between the batches and the predefined lengths of the batches, and wherein, if there is a deviation from the predefined gap, the control controls the speed of the allocating conveyor and/or the speed of the transportation conveyor in a corresponding manner.

\* \* \* \* \*